(12) United States Patent
Zijlstra et al.

(10) Patent No.: US 10,588,185 B2
(45) Date of Patent: Mar. 10, 2020

(54) LED TUBE LAMP

(71) Applicant: SIGNIFY HOLDING B.V., Eindhoven (NL)

(72) Inventors: Patrick John Zijlstra, Eindhoven (NL); Frits Tobi De Jongh, Eindhoven (NL); Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/755,188

(22) PCT Filed: Sep. 8, 2016

(86) PCT No.: PCT/EP2016/071153
§ 371 (c)(1),
(2) Date: Feb. 26, 2018

(87) PCT Pub. No.: WO2017/042255
PCT Pub. Date: Mar. 16, 2017

(65) Prior Publication Data
US 2018/0249538 A1 Aug. 30, 2018

(30) Foreign Application Priority Data
Sep. 9, 2015 (EP) .................................... 15184433

(51) Int. Cl.
*H05B 33/08* (2006.01)
*F21K 9/278* (2016.01)
(Continued)

(52) U.S. Cl.
CPC ........... *H05B 33/0809* (2013.01); *F21K 9/27* (2016.08); *F21K 9/278* (2016.08);
(Continued)

(58) Field of Classification Search
CPC .. Y02B 20/383; Y02B 20/346; Y02B 20/341; Y02B 20/342; H05B 33/0818;
(Continued)

(56) References Cited

U.S. PATENT DOCUMENTS 9,526,145 B2 * 12/2016 Xiong .................. H05B 33/089
9,557,044 B2 * 1/2017 Davenport .............. F21V 25/00
(Continued)

FOREIGN PATENT DOCUMENTS

JP 2011198795 A 10/2011
JP 2011243331 A 12/2011
(Continued)

OTHER PUBLICATIONS

Electronics-tutorials.ws, ("https://www.electronics-tutorials.ws/inductor/mutual-inductance.html"), retrieved Jul. 23, 2018.*
(Continued)

*Primary Examiner* — Tung X Le
*Assistant Examiner* — Borna Alaeddini (57) ABSTRACT

The invention describes an LED tube lamp (1) realized for use with a high-frequency ballast (2), which LED tube lamp (1) comprises an LED arrangement (100); a driver (10) realized to drive the LED arrangement (100); and a first connecting terminal pair (11, 12) for connecting to first outputs (21, 22) of the high-frequency ballast (1) and a second connecting terminal pair (13, 14) for connecting to second outputs (23, 24) of the high-frequency ballast (2), and wherein the LED tube lamp (1) is characterized by a magnetically coupled inductor pair ($L_{11}$, $L_{12}$) comprising a first inductor ($L_{11}$) in series with one terminal (11) of the first connecting terminal pair (11, 12) and a second inductor ($L_{12}$) in series with the other terminal (12) of the first connecting terminal pair (11, 12). The invention further describes a LED tube lighting arrangement (3).

13 Claims, 4 Drawing Sheets (51) Int. Cl.
*F21K 9/27* (2016.01)
*F21Y 115/10* (2016.01)

(52) U.S. Cl.
CPC ..... H05B 33/0842 (2013.01); H05B 33/0887 (2013.01); *F21Y 2115/10* (2016.08); *Y02B 20/383* (2013.01)

(58) Field of Classification Search
CPC ............ H05B 33/0845; H05B 33/0887; H05B 33/0809; H05B 33/0815; H05B 33/0827; H05B 33/0842; F21K 9/27; F21K 9/278
See application file for complete search history.

(56) References Cited

U.S. PATENT DOCUMENTS

| | | | | |
|---|---|---|---|---|
| 9,629,211 | B2 * | 4/2017 | Xiong | H05B 33/0815 |
| 9,775,215 | B2 * | 9/2017 | Xiong | H05B 33/0887 |
| 9,807,826 | B2 * | 10/2017 | Xiong | H05B 33/0809 |
| 2004/0113564 | A1 * | 6/2004 | Glaser | H05B 41/2825 |
| | | | | 315/224 |
| 2006/0284569 | A1 | 12/2006 | Wey et al. | |
| 2010/0270942 | A1 * | 10/2010 | Hui | H05B 33/0809 |
| | | | | 315/291 |
| 2011/0043127 | A1 | 2/2011 | Yamasaki | |
| 2012/0146546 | A1 | 6/2012 | Hu et al. | |
| 2012/0274237 | A1 * | 11/2012 | Chung | F21V 23/02 |
| | | | | 315/297 |

FOREIGN PATENT DOCUMENTS

| | | |
|---|---|---|
| JP | 2014107040 A | 6/2014 |
| JP | 2015109164 A | 6/2015 |
| WO | WO2012163287 A1 | 12/2012 |
| WO | WO2015028526 A1 | 3/2015 |

OTHER PUBLICATIONS

Dr. M. Weirich, "Implementing Power Electronics in Fluorescent Lighing", Fairchild Semiconductor Global Power Resource Center, Europe, Jul. 30, 2007, pp. 1-5.

* cited by examiner

LED TUBE LAMP

CROSS-REFERENCE TO PRIOR APPLICATIONS

This application is the U.S. National Phase application under 35 U.S.C. § 371 of International Application No. PCT/EP2016/071153, filed on Sep. 8, 2016, which claims the benefit of European Patent Application No. 15184433.9, filed on Sep. 9, 2015. These applications are hereby incorporated by reference herein.

FIELD OF THE INVENTION

The invention describes an LED tube lamp; and a lighting arrangement comprising such an LED tube lamp.

BACKGROUND OF THE INVENTION

Tube lamps have been preferred over incandescent lamps on account of their efficiency. A tube lamp such as a fluorescent tube lamp operates from a ballast, which regulates the current through the lamp. Tube lamps have been developed for running on electromagnetic (EM) ballasts, and also on high-frequency (HF) ballasts. An electronic ballast for a fluorescent lamp basically fulfills three functions: it provides filament heating, it ignites the lamp, and it stabilizes the lamp current in steady state. The performance of an electronic ballast is generally superior to that of a magnetic ballast, since it can essentially eliminate flicker and can start the lamp faster.

LED lamps are even more efficient than fluorescent lamps, and are attractive on account of their long life and low energy consumption. Retrofit LED tube lamps have been developed for insertion into the housings of fluorescent tube lamp fixtures. In order to use a retrofit LED tube lamp (commonly referred to as an "LED tube") with a legacy ballast, one option has been for a technician to rewire the fixture in case an HF ballast is present in the fixture. In recent years standardization bodies have commenced developing safety standards for "direct replacement" LED tubes, i.e. non-integrated or semi-integrated LED tube lamps for which the ballast is part of the lighting fixture, and for which the lighting fixture does not require modification or rewiring. Since the ballast is incorporated in the fluorescent lighting fixture, it is preferable to design the LED tube lamp to operate from that ballast. For this reason, the ballast of a fluorescent tube lamp fixture is referred to as a "legacy ballast" in the following. One widely used HF ballast design is the half-bridge LC resonant circuit, of which countless variations are possible. One of the challenges in the development of HF-compatible LED tubes is to ensure compatibility with many different kinds of ballast topologies. The variety of concepts based on the different topologies effectively makes it impossible to design a passive matching circuit for a LED tube that matches all HF-ballasts.

Therefore, it is an object of the invention to provide an improved LED tube lamp that is economical, efficient, and compatible with various different kinds of HF ballast.

SUMMARY OF THE INVENTION

The object of the invention is achieved by the LED tube lamp of claim 1; and by the lighting arrangement of claim 13.

According to the invention, the LED tube lamp is realized for use with a high-frequency ballast, and comprises an LED arrangement; a driver realized to drive the LED arrangement; and a first connecting terminal pair for connecting a first output pin pair of the high-frequency ballast to a first driver input terminal and a second connecting terminal pair for connecting a second output pin pair of the high-frequency ballast to a second driver input terminal. The inventive LED tube lamp is characterized by a magnetically coupled inductor pair of which a first inductor is connected in series with one terminal of the first connecting terminal pair, and a second inductor is connected in series with the other terminal of the first connecting terminal pair, wherein said first inductor is in a first loop allowing current into the driver from the high-frequency ballast, said second inductor is in a second loop, and said coupled inductor pair are magnetically coupled in such a manner that the current in the second loop is limited in response to the current in the first loop.

An advantage of the LED tube lamp according to the invention is that it provides a simple and economical way of improving passive matching to HF ballasts. The inventive LED tube lamp or "LED tube" advantageously reduces the ballast output current, and therefore also the ballast power losses and filament resistor power losses on the second loop, thereby further lowering the operating costs. The only additional circuit elements—over and above a comparable prior art design—can be limited to a coupled inductor pair allowing a very economical realization of the LED tube. Furthermore, the driver can comprise a simple and cheap diode bridge rectifier, which also contributes to the economical realization of the inventive LED tube.

As indicated above, a LED tube generally comprises a filament emulation circuit to emulate the behavior of a fluorescent lamp from the point of view of the ballast. This is achieved by a filament resistor at each input terminal. In the prior art, the two filament resistors of each connecting terminal pair are joined at a common node, which in turn is connected to one of the two driver inputs. In the following, to simplify the explanations, the first inductor of the coupled inductor pair will be referred to as the "upper coupled inductor" or "upper inductor", and the second inductor of the coupled inductor pair will be referred to as the "lower coupled inductor" or "lower inductor". This convention will be maintained throughout the description. A filament resistor can be series-connected between one terminal of the first connecting terminal pair and the upper inductor, and another filament resistor can be series-connected between the other terminal of the first connecting terminal pair and the lower inductor. In other words, for the LED tube according to the invention, a common node is formed at the connection between upper inductor, lower inductor, and one of the two driver inputs.

According to the invention, the LED tube lighting arrangement comprises a legacy HF ballast realized for use with a fluorescent tube lamp; and an inventive LED tube lamp connected across the outputs of the HF ballast.

An advantage of the LED tube lighting arrangement according to the invention is that it covers a greater variety of legacy HF ballasts. This increases the range of older fluorescent fixtures that can be retro-fitted with more economical and long-lasting LED tubes according to the invention.

The dependent claims and the following description disclose particularly advantageous embodiments and features of the invention. Features of the embodiments may be combined as appropriate. Features described in the context of one claim category can apply equally to another claim category.

In the following, without restricting the invention in any way, it may be assumed that the LED tube lamp or LED tube is realized as a retrofit tube lamp. Such a LED tube can be used to replace an existing fluorescent tube lamp, and comprises an LED load, an internal LED driver, a filament emulation circuit, a pin safety circuit, etc., arranged in a lamp housing which has the same dimensions and connecting interfaces as the fluorescent lamp type which it will replace. The LED tube lamp according to the invention can be realized to replace any of the usual fluorescent tube lamps, for example the LED tube lamp can be realized as a linear quad-pin tube lamp or as a compact fluorescent lamp (CFL) in which the tube is shaped with a number of turns. The terms "LED tube lamp" and "LED tube" may be used interchangeably in the following. In a preferred embodiment of the invention, the LED tube lamp may be realized as a retrofit lamp to replace a linear fluorescent lamp with a tube diameter in the range of 5.0 mm to 50.0 mm or a compact fluorescent lamp. Preferably, the LED tube according to the invention comprises an essentially tubular housing to accommodate at least the LED arrangement, the driver and the coupled inductor pair.

The driver of the LED tube according to the invention converts an AC voltage/current at the first and second input terminals into a DC voltage/current for the LED arrangement. The LED arrangement can comprise any number of LEDs such as power LEDs, arranged in series and/or parallel combinations in order to deliver the desired light output. It may be assumed that the internal LED driver comprises a half-bridge circuit that periodically shunts the driver input current to the half-bridge at a certain duty cycle so that the LED current can be controlled to a desired level. The LED driver can also be based on a switched-mode topology, boost, a buck, or a buck-boost, etc.

A typical legacy HF ballast can comprise a self-oscillating half-bridge topology. This can be combined with a valley-fill circuit on the input, and/or with a power feedback system for feeding back the lamp current to the input of the half-bridge. As will be known to the skilled person, a power feedback system can be implemented to maintain a stable output power when the load condition varies (for example when the lamp voltage fluctuates). As will be known to the skilled person, a power feedback circuit can be implemented in the ballast in order to deliver essentially constant power to the lamp regardless—to a certain extent—of the lamp voltage. When a power feedback circuit is used, lamp current and/or lamp voltage are fed back from an output terminal of the lamp via a capacitor to an input stage of the ballast. In this way, if the lamp current increases, more current is injected at the input to the ballast. This causes the DC bus voltage of the ballast to increase, with the result that more power will be delivered to the lamp, in an attempt to keep the lamp operating in constant power mode. This can be an improvement over other types of self-oscillating ballasts, for which the ballast output power tends to drop if the lamp voltage drops.

A high-frequency ballast for use with a fluorescent lamp generally comprises a first terminal connector pair and a second terminal connector pair. These connector pairs can be realized as sockets at opposite ends of a tube lamp fixture, for example. Alternatively, the terminals can be realized in a single socket with 4-pins, for example in a G24/GX24 fitting of a CFL lamp. Generally, the HF ballast will have an inductor connected between the self-oscillating half-bridge and a first terminal of the first socket, and a capacitor connected between a terminal of the first socket and a terminal of the second socket. The purpose of the capacitor across the outputs of a fluorescent tube lamp ballast is to form an LC resonant circuit with the inductor. During start-up phase the high voltage generated by the resonant circuit ignites the lamp, and in steady state the ballast regulates the lamp current via the inductor. In a preferred embodiment of the invention, one of the terminals of the first terminal pair and one of the terminals of the second terminal pair are connected across the output capacitor of the HF ballast. The second terminal of the LED tube second terminal pair is generally connected back to the half-bridge. The resulting topology yields a resonant circuit comprising the inductor of the HF ballast, the upper inductor, the lower inductor, and the HF ballast output capacitor.

In a particularly preferred embodiment of the invention, the LED tube lamp is realized to present a large impedance in the circuit path comprising the first connecting terminal pair and the output capacitor of the HF ballast, namely the second loop. To this end, the LED tube lamp preferably comprises a matching circuit or matching network with an inductor connected between a common node of the coupled inductor pair and a first input of the driver, and a capacitor connected between a common node of the coupled inductor pair and a second input of the driver.

Preferably, the upper and lower inductors of the coupled inductor pair are connected to have equal polarity in an impedance path comprising the upper filament resistor of the first connecting terminal pair, the coupled inductor pair, the lower filament resistor of the first connecting terminal pair, the ballast output capacitor, and the upper filament resistor of the second connecting terminal pair. This realization results in a high impedance over a resonant circuit path over the HF ballast inductor, the first connecting terminal pair and the HF ballast output capacitor. To obtain the desired large impedance, the inductors of the coupled inductor pair preferably have essentially equal values. For example, when essentially equal inductor values are used, the inductance can be increased by a factor of four. The resulting high impedance effectively isolates (to a certain extent) the HF ballast output capacitor from the resonant circuit or "resonant tank" formed by the ballast inductor, the upper coupled inductor and the matching circuit, and reduces the LED current. The current through the HF ballast capacitor is reduced, on account of its being largely excluded from the resonant tank by the coupled inductor pair. Therefore, the ballast capacitor is less dominant, and the matching circuit can be designed with less dependence on the ballast capacitor. The reduced current in the HF ballast output capacitor results in a reduction of power losses in the ballast as well as in the filament resistors.

The choice of inductor value will influence the impedance of the resonant circuit containing the coupled inductor pair. A suitable value for an upper inductor/lower inductor is preferably with the range of 10.0 μH to 1.0 mH. With a suitable choice of inductor value, and by coupling the inductors with equal polarity, in a preferred embodiment of the invention, a coupling coefficient k of the coupled inductor pair of at least 0.75, more preferably at least 0.85, most preferably at least 0.95 can be achieved.

In a further preferred embodiment of the invention, the inductor of the matching circuit can be used to obtain a desired high impedance in the circuit path comprising the first connecting terminal pair and the output capacitor of the HF ballast. To this end, the inductors of the coupled inductor pair are connected to have opposite polarity from the point of view of the impedance path comprising the upper inductor of the coupled inductor pair, the matching circuit inductor and the driver, and the matching circuit inductor is coupled with the coupled inductor pair with the equal polarity, thereby the matching circuit inductor decreases the current in the first loop and in turn decreases the current in the second loop. Preferably, in such a realization, the upper coupled inductor is series-connected with the HF ballast inductor, and the upper coupled inductor and the matching circuit inductor have the same polarity in the impedance path defined above. The "coupling direction" is preferably such that, looking from the input, i.e. from the point of view of the ballast, the "orientation" of these inductors is the same. This will be made clear with the aid of the diagrams. In this alternative embodiment, the inductance of the lower coupled inductor is cancelled out by the inductance of the upper coupled inductor because of the way in which they are coupled. The filament impedance of the LED tube is therefore mainly determined by the filament resistors at the first connecting terminal pair. The ballast capacitor is not isolated in this circuit configuration, but is part of the resonant tank instead. An undesirably high current is avoided by the coupling of the upper coupled inductor and the matching circuit inductor. Because of this coupling, an additional inductance is effectively inserted in series with the ballast output and the matching circuit capacitor. This inductance increases the lamp impedance and detunes the resonant tank comprising the inductor and capacitor of the matching circuit, thereby reducing the lamp power. The choice of inductor value will influence the impedance of a resonant circuit containing the coupled inductor pair and the third inductor in this case. A suitable value for the matching circuit inductor can be 100.0 µH to 5.0 mH. Here also, power losses in the ballast and the filament resistors will be reduced due to the lower current. Furthermore, because of the reduced current, the HF ballast output capacitor will be less dominant, as described above, and the matching circuit can be designed with less consideration of the capacitance value of HF ballast output capacitor.

Other objects and features of the present invention will become apparent from the following detailed descriptions considered in conjunction with the accompanying drawings. It is to be understood, however, that the drawings are designed solely for the purposes of illustration and not as a definition of the limits of the invention.

WO2012163287A1 discloses a driver circuit for powering DC lamp in non-DC lamp fitting. In FIG. 3a it discloses a topology in which inductors are connected at the input terminal pairs of the lamp system 50 to the ballast circuit. The inductors are for emulating the filaments, not magnetically coupled with each other and not for limiting a current in one inductor in response to a current in another inductor.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
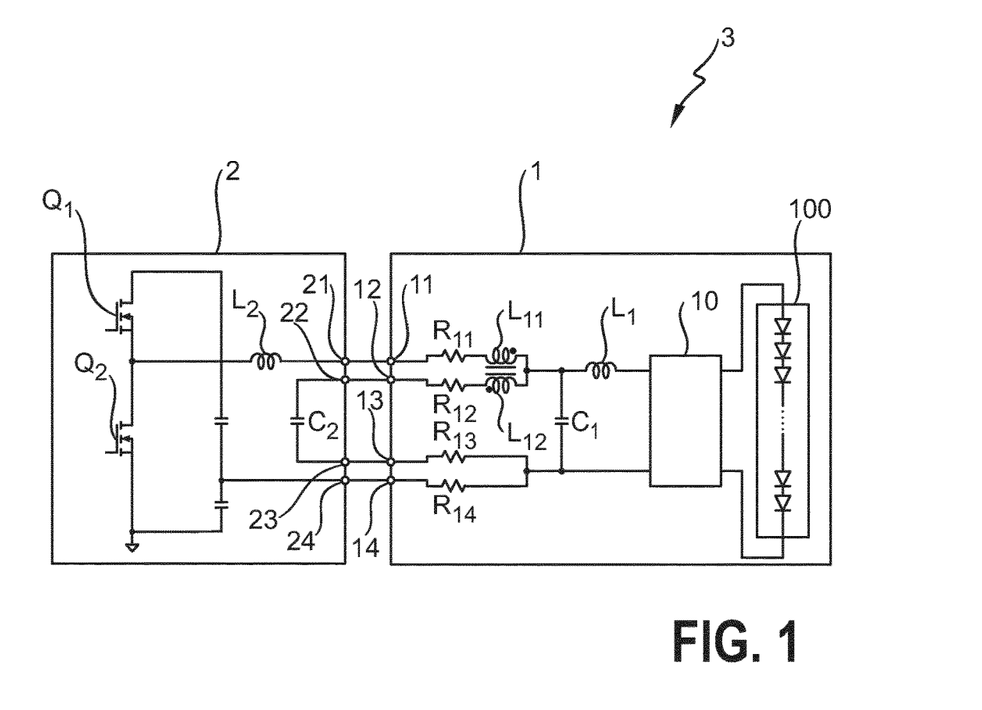
FIG. 1 shows a block diagram of a first embodiment of a tube lamp arrangement according to the invention.

FIG. 1 shows a block diagram of a first embodiment of a LED tube 1 according to the invention. The LED tube 1 is connected to a HF ballast 2, which in turn is connected to a mains power supply (not shown). The legacy HF ballast 2 is designed to provide current to a fluorescent lamp via a first output connector pair 21, 22 and a second output connector pair 23, 24. In this exemplary embodiment, the ballast is a self-oscillating ballast 2 comprising switching transistors $Q_{21}$, $Q_{22}$, an inductor $L_2$, and an output capacitor $C_2$ connected across outputs 22, 23 of the ballast 2. The switching transistors $Q_{21}$, $Q_{22}$ are bipolar transistors or MOSFETs, and their control inputs are provided by a self-oscillating circuit consisting of a ring core transformer, which is not shown in the diagram for the sake of simplicity, since any such details will be known to the skilled person.

The LED tube 1 comprises an LED arrangement 100 connected across the outputs of an LED driver 10, a first terminal pair 11, 12 and a second terminal pair 13, 14 for connecting to a fixture containing the HF ballast 2. Filament resistors $R_{11}$, $R_{12}$, $R_{13}$, $R_{14}$ are connected at the terminals 11, 12, 13, 14 for emulating the behavior of a fluorescent lamp. The LED tube 1 comprises a matching circuit $L_1$, $C_1$ to provide compatibility with the HF ballast 2. The inventive LED tube 1 comprises a coupled inductor pair $L_{11}$, $L_{12}$ comprising a first "upper" inductor $L_{11}$ in series with an "upper" filament resistor $R_{11}$ of the first terminal pair, and a second "lower inductor" $L_{12}$ in series with a "lower" filament resistor $R_{12}$ of the first terminal pair. As can be seen in the diagram, the "upper" inductor $L_{11}$ and the "lower inductor" $L_{12}$ are coupled. The placement of the dots indicates that the inductors $L_{11}$, $L_{12}$ of the coupled pair are connected with equal polarity, following the dot convention.

The coupled pair $L_{11}$, $L_{12}$ does not have large influence on the impedance in the main power/circuit path, also referred as the first loop, comprising the HF ballast inductor $L_2$, the upper filament resistor $R_{11}$, the upper inductor $L_{11}$, and the matching circuit inductor $L_1$. While the upper coupled inductor $L_{11}$ does insert additional inductance between the ballast inductor $L_2$ and the matching circuit inductor $L_1$, the upper coupled inductor $L_{11}$ is small compared to the combination of ballast inductor $L_2$ and the matching circuit inductor $L_1$, so its influence is also correspondingly small. Therefore, the impact of the coupled pair $L_{11}$, $L_{12}$ on the main power conversion stage 10 is minimal. Its primary function is to isolate the ballast capacitor $C_2$ from the resonant circuit that also includes the HF ballast inductor $L_2$, the matching circuit capacitor $C_1$, and the matching circuit inductor $L_1$.

In this embodiment, the upper and lower inductors $L_{11}$, $L_{12}$ have essentially equal values. This results in a four-fold increase in impedance, as seen by the ballast, in the circuit comprising the HF ballast inductor $L_2$, the upper inductor $L_{11}$, the lower inductor $L_{12}$ and the HF ballast output capacitor $C_2$, also referred as the second loop. The high impedance isolates, to a certain extent, the output capacitor $C_2$ from the resonant circuit and reduces the LED current $I_{LED}$. Since the current through the output capacitor $C_2$ is reduced, the output capacitor $C_2$ is less dominant, and the matching circuit $L_1$, $C_1$ can be designed with less dependence on the output capacitor $C_2$. The reduced current in the output capacitor $C_2$ also results in a favorable reduction of power losses in the filament resistors $R_{11}$, $R_{12}$, $R_{13}$, $R_{14}$.

In another way of explaining, in positive half cycle, the current flows into the upper inductor $L_{11}$ and flows out at the dotted terminal, thus the inductive voltage at the lower inductor $L_{12}$ is positive at the un-dotted terminal and negative at the dotted terminal. This inductive voltage would cancel a part of the voltage drop across the lower inductor $L_{12}$, and resistor $R_{12}$, the capacitor $C_2$, and the resistor $R_{13}$ provided by the ballast 2. Namely the currents through the inductor $L_{11}$, $L_{12}$ should vary in the opposite direction: the bigger the current in the inductor $L_{11}$, the smaller the current in the inductor $L_{12}$.

The inductors $L_{11}$, $L_{12}$ can have essentially equal values in the range 10.0 µH-1.0 mH. The resulting coupling coefficient k of the coupled inductor pair $L_{11}$, $L_{12}$ can be favorably high. The value of the inductors $L_{11}$, $L_{12}$ should be sufficiently large to ensure that current through resistor $R_{12}$ is suppressed. While the inductor $L_1$ can be chosen to have the same value as each of the coupled inductors $L_{11}$, $L_{12}$, this is not absolutely necessary. The values of the inductors $L_{11}$, $L_{12}$ are preferably not too high, to ensure that the upper inductor $L_{11}$ does not adversely affect the matching network, and therefore also the LED current and LED tube/ballast compatibility. In general, the upper inductor $L_{11}$ is preferably smaller (in its value of inductance) than the matching circuit inductor $L_1$.

Figure 2:
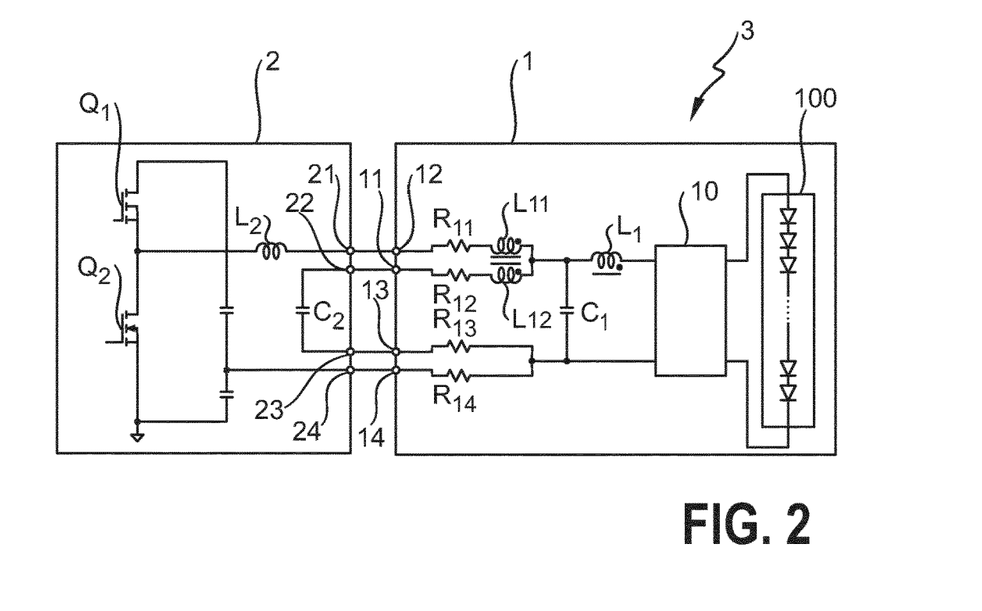
FIG. 2 shows a block diagram of a second embodiment of a tube lamp arrangement according to the invention.

FIG. 2 shows a second embodiment of the LED tube lamp 1 according to the invention. The diagram shows the same filament emulation resistors $R_{11}$, $R_{12}$, $R_{13}$, $R_{14}$ connected at the terminals 11, 12, 13, 14 for emulating the behavior of a fluorescent lamp. Here also, the LED driver 10 can be a switched-mode driver, a boost, a buck, or a buck-boost driver, etc., or simply a diode rectifier bridge. In this embodiment, the matching circuit inductor $L_1$ is also coupled to the coupled inductor pair $L_{11}$, $L_{12}$. As can be seen in the diagram, following the dot convention, the upper inductor $L_{11}$ and the lower inductor $L_{12}$ of the coupled inductor pair $L_{11}$, $L_{12}$ are coupled with opposite polarity. Contrary with respect to the embodiment in FIG. 1, the currents through the inductor $L_{11}$, $L_{12}$ should vary in the same direction: when the current through $L_{11}$ decreases, the current through $L_{12}$ also decreases. Further, the matching circuit inductor $L_1$ has the same polarity as the upper inductor $L_{11}$ of the coupled pair. This circuit functions in a different way compared to the circuit described in FIG. 1. In this exemplary embodiment, the inductance of the lower inductor $L_{12}$ is cancelled out by the inductance of the upper inductor $L_{11}$ because of the coupling effect. Therefore, the filament impedance of the LED tube is mainly determined by the filament emulation resistors $R_{11}$, $R_{12}$ at the first terminal pair 11, 12. The ballast capacitor $C_2$ is not isolated in this circuit configuration, but instead is part of the resonant tank. To avoid an unfavorably high current, the upper inductor $L_{11}$ is coupled with the matching circuit inductor $L_1$. Because of this coupling, the inductor $L_1$ would induce a positive voltage from left to right of the inductor $L_1$, and an additional inductance is effectively inserted in series with the ballast output and matching circuit capacitor $C_1$. This inductance increases the lamp impedance and detunes the resonant tank comprising the ballast inductor $L_2$ and the ballast capacitor $C_2$. Therefore, the power current in the first loop is limited, and in turn the current in the second loop is also limited. The result is that the power consumption of the lamp is reduced significantly.

As indicated above, the choice of inductor value will influence the impedance of a resonant circuit containing the coupled inductor pair $L_{11}$, $L_{12}$ and the matching circuit inductor $L_1$ in this case. A suitable value for the matching circuit inductor $L_1$ can be 100.0 µH to 5.0 mH. Here also, power losses in the ballast and the filament emulation resistors $R_{11}$, $R_{12}$, $R_{13}$, $R_{14}$ will be reduced due to the lower currents.

Figure 3:
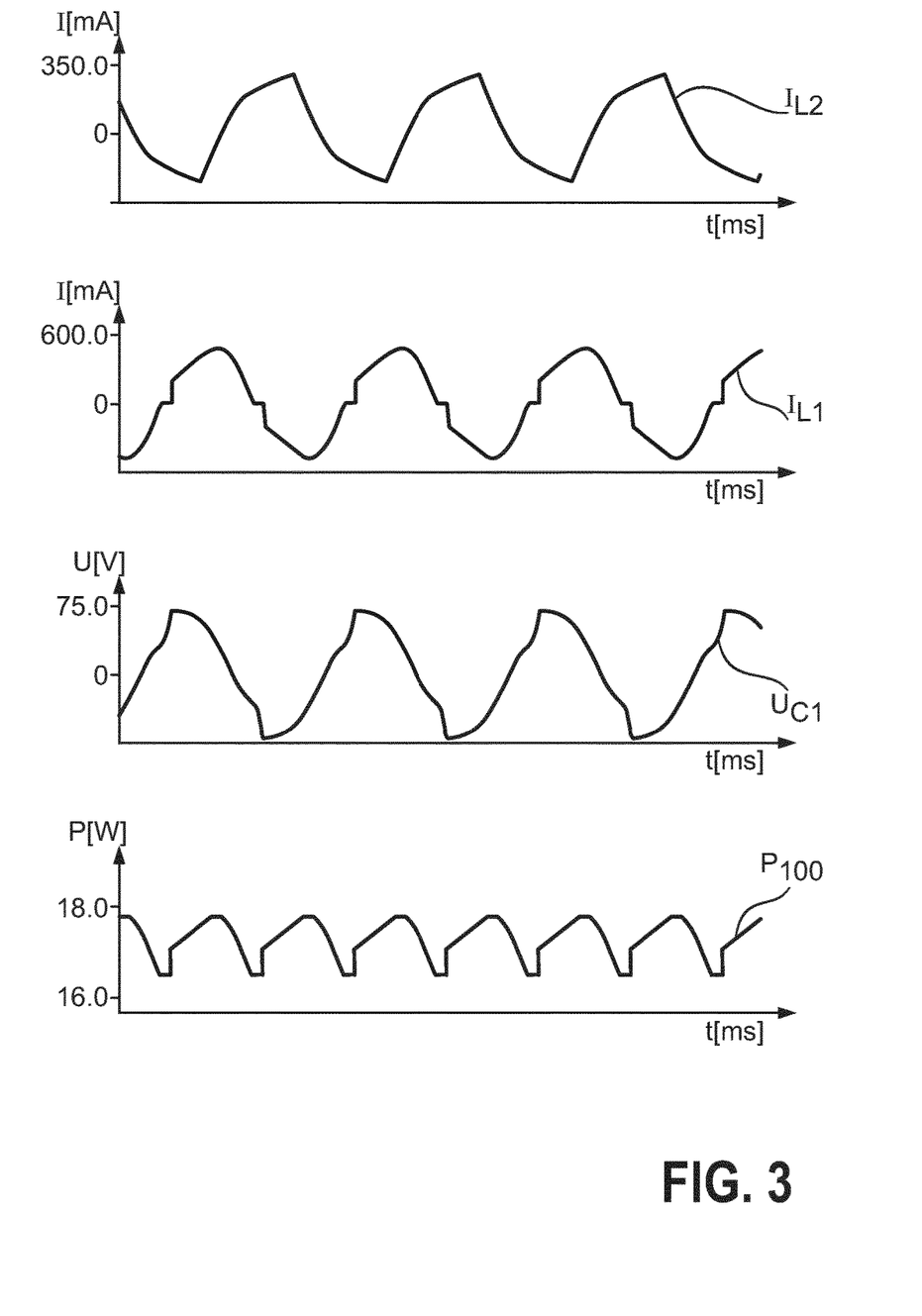
FIG. 3 shows waveforms relating to the operation of the inventive LED tube of FIG. 2.

FIG. 3 shows waveforms relating to the operation of an LED tube lamp 1 according to the invention. The waveforms shown are ballast inductor current $I_{L2}$ (i.e. the current [mA] through HF ballast inductor $L_2$); inductor current $I_{L1}$ (i.e. the current [mA] through the matching circuit inductor $L_1$ of the embodiment shown in FIG. 2); output voltage of the ballast, which is roughly equal to the matching capacitor voltage $U_{C1}$ (i.e. the voltage [V] across the matching capacitor $C_1$); and LED power $P_{100}$ (i.e. the power [W] dissipated by the LED arrangement 100). The X-axis is the same in each case, showing time [ms]. The effect of the coupled inductors is to obtain a favorably low ballast output current $I_{L2}$ of only 350 mA peak; a favorably low matching capacitor voltage $U_{C1}$ of only 75 V peak; and a very favorably low LED average power dissipation of only 17 W. These values correspond to ballasts without power feedback, which makes the inventive LED tube compatible for both types of ballast.

Figure 4:
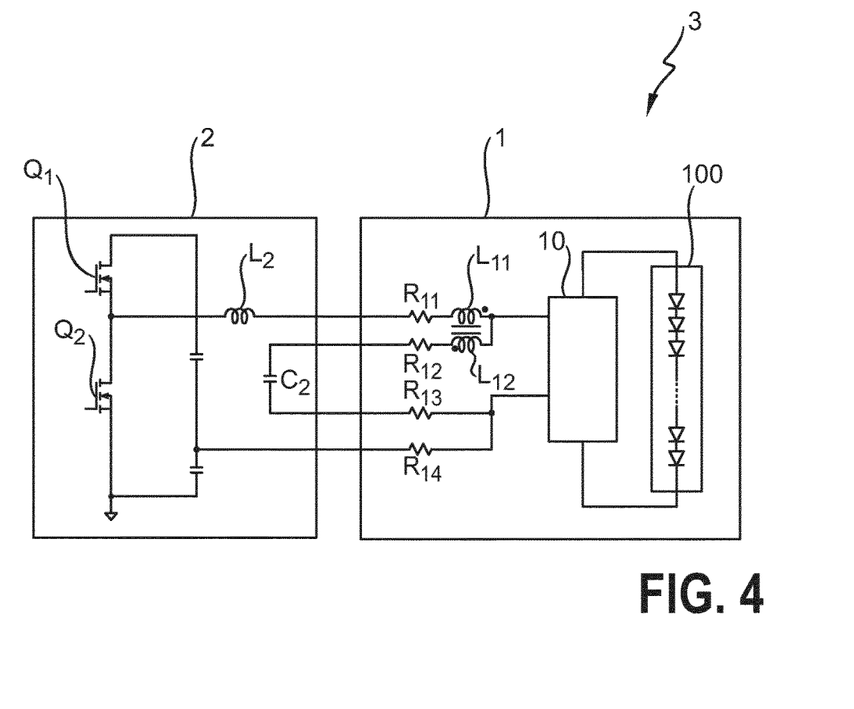
FIG. 4 shows a block diagram of a third embodiment of a tube lamp arrangement according to the invention.

In a favorably cheap realization of the inventive LED tube, the driver 10 is just a diode bridge rectifier. The LED current is not regulated, and is determined by the ballast type. For such a circuit the matching network $L_1$, $C_1$ helps maintain a relatively constant LED current with various different ballasts. Without the matching circuit $L_1$, $C_1$, the variation of LED current can be larger between different kinds of HF ballast. FIG. 4 shows a third embodiment of a LED tube 1 according to the invention, in a simplified version that does not make use of a matching network. This simpler circuit realization may be suitable for use in a lamp that does not have any strict requirements regarding LED current variation between various types of HF ballasts.

In the same way as described above, the LED tube 1 is connected to a HF ballast 2, for example a self-oscillating ballast 2. This embodiment is essentially identical in structure to that of FIG. 1, but without any LC matching circuit. The effect of the coupled inductor pair $L_{11}$, $L_{12}$ at the first terminal 11, 12 is to increase the lamp impedance as seen by the ballast and to increase the impedance of the circuit path comprising C2. This can be achieved by a suitable choice of inductor values for the coupled inductor pair $L_{11}$, $L_{12}$. For example, when the inductors $L_{11}$, $L_{12}$ have essentially equal values, the result is a four-fold increase in impedance, as seen by the ballast, in the circuit comprising the HF ballast inductor $L_2$, the upper inductor $L_{11}$, the lower inductor $L_{12}$ and the HF ballast output capacitor $C_2$. Here also, the inductors $L_{11}$, $L_{12}$ can have essentially equal values in the range 10.0 µH-1.0 mH.

Figure 5:
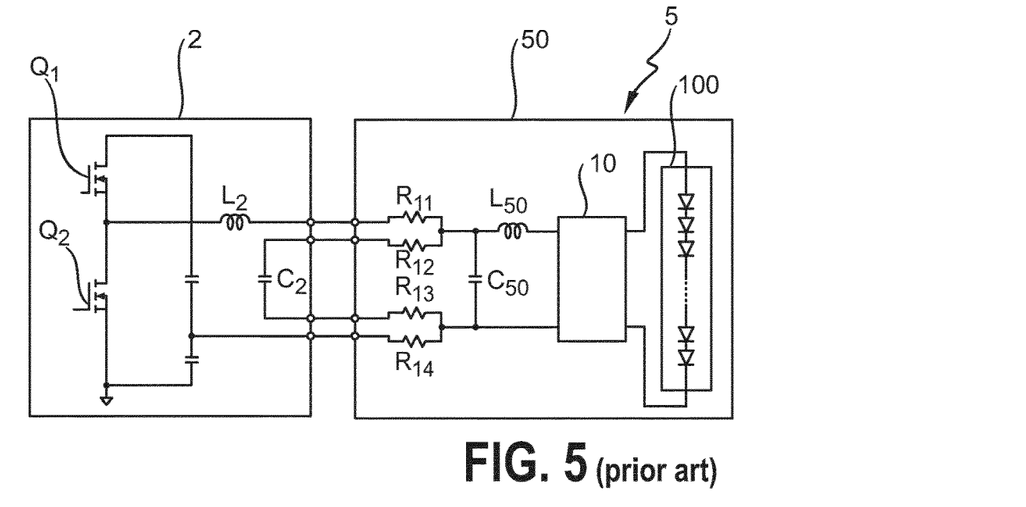
FIG. 5 shows a prior art LED tube.

FIG. 5 shows a lighting arrangement 5 with a prior art retrofit LED tube 50 connected to a HF ballast 2, which in turn is connected to a mains power supply 3. Here also, the ballast is a self-oscillating ballast 2 comprising switching transistors $Q_{21}$, $Q_{22}$, an inductor $L_2$, and an output capacitor $C_2$ connected across outputs 22, 23 of the ballast 2. For HF ballasts, a basic self-oscillating half-bridge topology is commonly used, sometimes combined with a valley-fill circuit on the input or with power feedback, where the lamp current is feedback to the input of the half-bridge. The variety of concepts based on the different combined topologies makes it essentially impossible to design a LED tube with a passive matching circuit that matches all available legacy HF ballasts. The LED tube 50 must emulate the tube lamp filaments correctly in order to ensure safe and reliable operation of the ballast 2. On the other hand, the LED tube 50 should dissipate as little power as possible in the ballast and in the filament emulation circuitry in order to avoid unnecessary energy consumption. In the legacy HF ballast 2, the purpose of the output capacitor $C_2$ is to provide the ignition voltage for a fluorescent lamp. When a prior art LED tube 50 is retrofitted to this legacy ballast 2, the current through this capacitor $C_2$ will depend on the AC/DC converter input voltage. The current through capacitor $C_2$ will result in power losses through resistors $R_{12}$, $R_{13}$.

Figure 6:
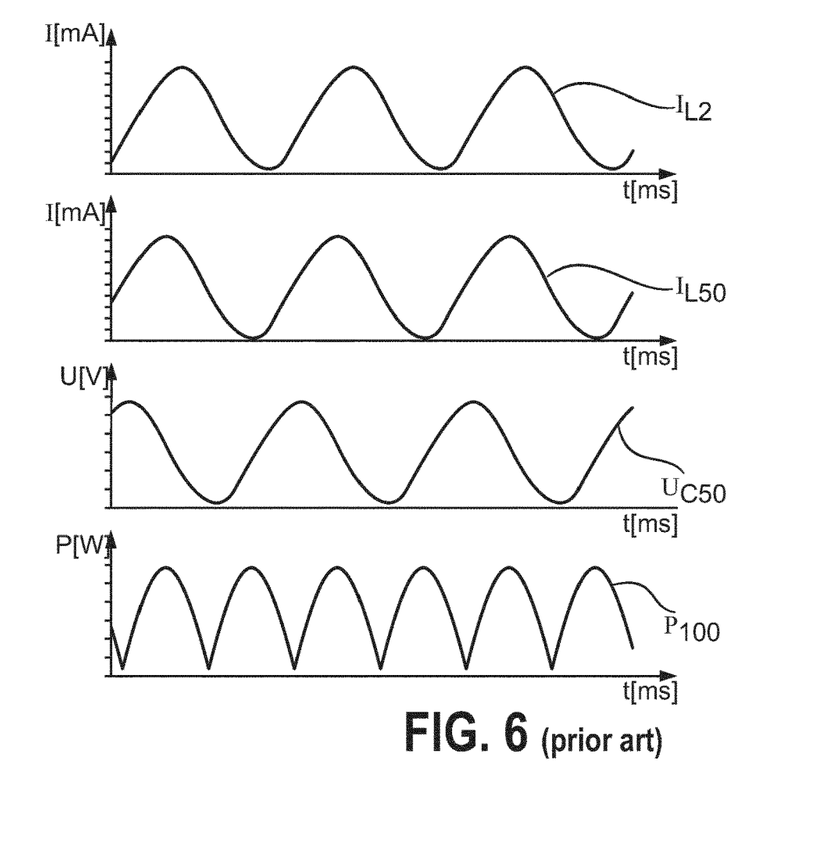
FIG. 6 shows waveforms relating to the operation of the prior art LED tube of FIG. 5.

FIG. 6 shows waveforms relating to the operation of the prior art LED tube 50. The waveforms shown are ballast output current $I_{L2}$ (i.e. the current [mA] through HF ballast inductor $L_2$); matching inductor current $I_{L50}$ (i.e. the current [mA] through the matching circuit inductor $L_{50}$); matching capacitor voltage $U_{C50}$ (i.e. the voltage [V] across the matching capacitor $C_{50}$), which is roughly equal to the output voltage of the ballast; and LED power $P_{100}$ (i.e. the power [W] dissipated by the LED arrangement 100). The X and Y axes in each case correspond to the X and Y axes of FIG. 3. Clearly, the performance of this prior art LED tube 50 is not as good as the LED tube 1 according to the invention: due to the increased feedback current, the current through $L_{50}$ will be boosted, resulting in too much power dissipation through the LEDs 100. The HF ballast output current $I_{L2}$ is close to 1 A peak, the matching capacitor voltage $U_{C50}$ is 300 V peak, and average power $P_{100}$ dissipated through the LEDs 100 is 28 W. Clearly, these observed waveforms illustrate the less favorable performance of the prior art LED tube as regards power dissipation.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

LIST OF REFERENCE NUMBERS

1 TLED
10 driver
11, 12, 13, 14 terminal
100 LED arrangement
2 high-end ballast
21, 22, 23, 24 terminal
3 TLED lighting arrangement
5 prior art lighting arrangement
50 prior art TLED
$R_{11}$, $R_{12}$, $R_{13}$, $R_{14}$ filament emulation resistor
$L_{11}$, $L_{12}$ coupled inductors
$L_1$ matching circuit inductor
$C_1$ matching circuit capacitor
$L_2$ HF ballast inductor
$C_2$ HF ballast capacitor
$Q_{21}$, $Q_{22}$ MOSFET
$I_{L1}$ matching circuit inductor current
$I_{L2}$ ballast output current
$U_{C1}$ matching circuit capacitor voltage
$P_{100}$ LED power
$I_{L50}$ prior art matching circuit inductor current
$U_{C50}$ prior art matching circuit capacitor voltage

The invention claimed is:

1. An LED tube lamp realized for use with a high-frequency ballast, the LED tube lamp comprising:
   an LED arrangement;
   a driver realized to drive the LED arrangement;
   a first connecting terminal pair for connecting to first outputs of the high-frequency ballast and a second connecting terminal pair for connecting to second outputs of the high-frequency ballast,
   a filament resistor set ($R_{11}$, $R_{12}$) comprising a first resistor ($R_{11}$) and a second resistor ($R_{12}$), and
   a magnetically coupled inductor pair ($L_{11}$, $L_{12}$) comprising a first inductor ($L_{11}$) and a second inductor ($L_{22}$), wherein the first inductor ($L_{11}$) and the first resistor ($R_{11}$) are connected in series with one terminal of the first connecting terminal pair and the second inductor ($L_{12}$) and the second resistor ($R_{12}$) are connected in series with the other terminal of the first connecting terminal pair,
   wherein said first resistor ($R_{11}$) and said first inductor ($L_{11}$) are in a first loop allowing current into the driver from the high-frequency ballast, said second resistor ($R_{12}$) and said second inductor ($L_{12}$) are in a second loop, and said first and second inductors ($L_{11}$, $L_{22}$) are magnetically coupled in such a manner that a current in the second loop is limited in response to the current in the first loop.

2. An LED tube lamp according to claim 1, wherein the second connecting terminal pair is connected with another filament resistor set ($R_{13}$, $R_{14}$).

3. An LED tube lamp according to claim 1, wherein the inductors of the coupled inductor pair ($L_{11}$, $L_{12}$) are connected to have equal polarity thereby the current in the first loop increases the impedance of the second loop and decreases the current in the second loop.

4. An LED tube lamp according to claim 1, wherein the inductors of the coupled inductor pair ($L_{11}$, $L_{12}$) have essentially equal values.

5. An LED tube lamp according to claim 4, wherein the matching circuit ($C_1$, $L_1$) comprises a matching circuit inductor ($L_1$) connected between a common node of the coupled inductor pair ($L_{11}$, $L_{12}$) and a first input of the driver, and a matching circuit capacitor ($C_1$) connected between a common node of the coupled inductor pair ($L_{11}$, $L_{12}$) and a second input of the driver.

6. An LED tube lamp according to claim 1, wherein the coupling coefficient of the coupled inductor pair ($L_{11}$, $L_{12}$) is at least 0.75.

7. An LED tube lamp according to claim 1, wherein an inductor of the coupled inductor pair ($L_{11}$, $L_{12}$) has a value in the range 10.0 µH to 1.0 mH.

8. An LED tube lamp according to claim 1, comprising a matching circuit ($C_1$, $L_1$).

9. An LED tube lamp according to claim 8, wherein the inductors of the coupled inductor pair ($L_{11}$, $L_{12}$) are connected to have opposite polarity, and the matching circuit inductor ($L_1$) is also coupled with the coupled inductor pair ($L_{11}$, $L_{12}$) with the equal polarity, thereby the matching circuit inductor ($L_1$) decreases the current in the first loop and in turn decreases the current in the second loop.

10. An LED tube lamp according to claim 8, wherein the matching circuit inductor ($L_1$) has a value in the range 100.0 µH to 5.0 mH.

11. An LED tube lamp according to claim 1, wherein the second terminal of the first connecting terminal pair and the first terminal of the second connecting terminal pair are realized for connection across another output of the first outputs and one output of the second outputs and in series with an output capacitor ($C_2$) of the HF ballast.

12. An LED tube lamp according to claim 1, realized as a retrofit lamp to replace a linear fluorescent lamp with a tube diameter in the range of 5.0 mm to 50.0 mm or a compact fluorescent lamp, and comprising an essentially tubular housing to accommodate at least the LED arrangement, the driver, a matching circuit ($C_1$, $L_1$), and the coupled inductor pair ($L_{11}$, $L_{12}$).

13. A LED tube lighting arrangement comprising:
a high-frequency ballast realized for use with a fluorescent tube lamp;
an LED tube lamp according to claim 1 connected to the high-frequency ballast.

* * * * *